INVENTOR
TERRILL G. TODD

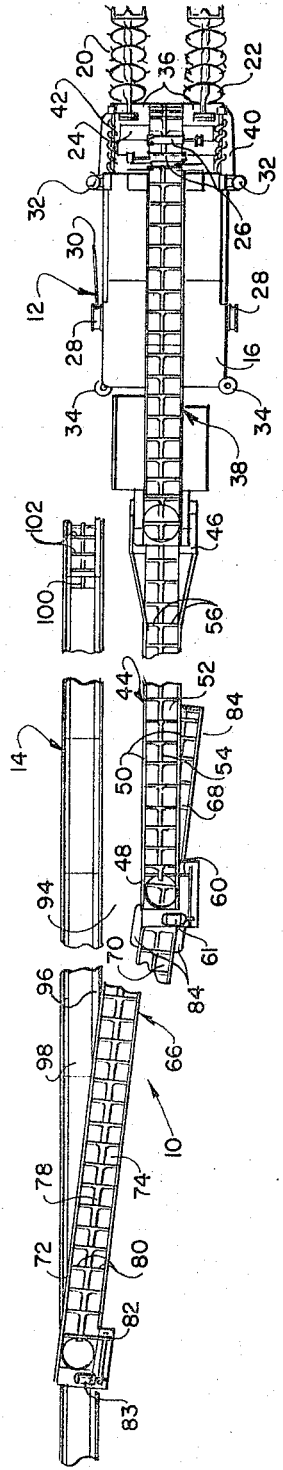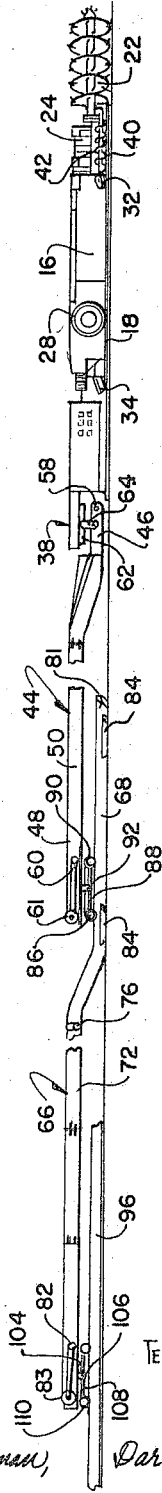

BY Cushman, Darby & Cushman
ATTORNEYS

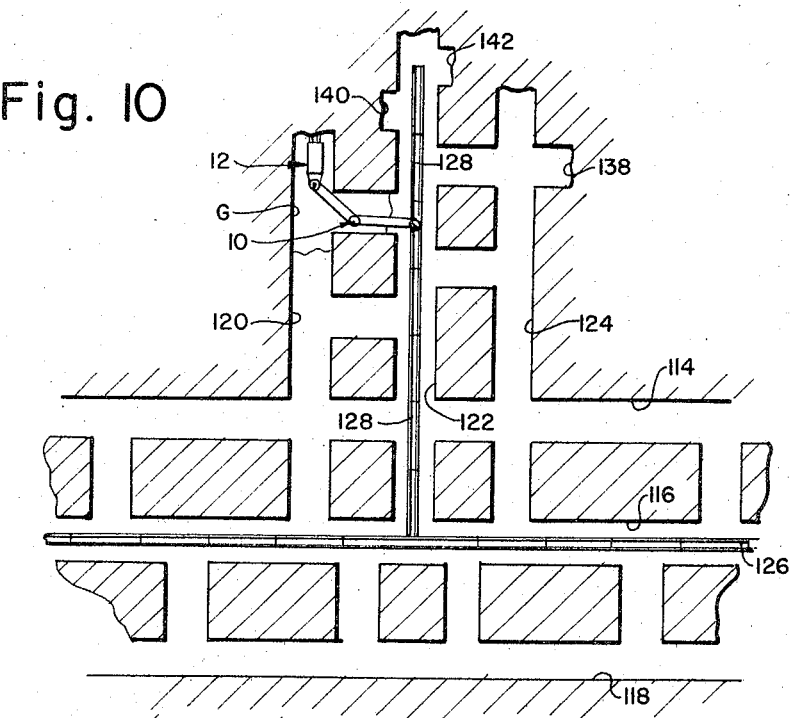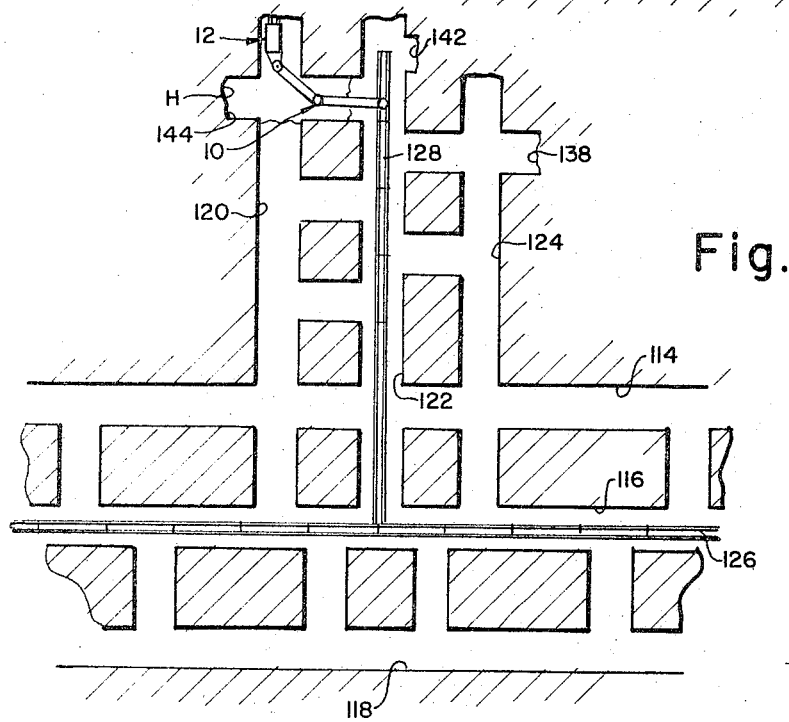

United States Patent Office 3,306,667
Patented Feb. 28, 1967

3,306,667
COAL MINING APPARATUS INCLUDING
CONVEYOR SYSTEM HAVING TOGGLE-
LIKE ARTICULATION
Terrill G. Todd, Beaver, W. Va., assignor to Wilcox Manufacturing Company, Raleigh, W. Va., a corporation of West Virginia
Continuation of application Ser. No. 159,636, Dec. 15, 1961. This application Sept. 10, 1965, Ser. No. 486,368
7 Claims. (Cl. 299—57)

This application constitutes a continuation of my copending application Serial No. 159,636, filed December 15, 1961.

The invention relates to mining, and more particularly to improved apparatus useful in mining minerals such as coal or the like.

In the last 30 years mechanization of coal mining procedures has advanced to a considerable extent. With the advent of machines capable of substantially continuously removing coal from the face of the mine it became necessary to provide continuous mechanized conveyors for transporting the coal from the face as it is removed by the miner out of the mine. Indeed, the use of conveyors for continuously transporting the coal out of the mine actually preceded the continuous mining machine.

With a completely mechanized system of mining one of the factors which contributes to considerable "down time," that is, time when the continuous mining machine can not be operated, is a result of the necessity of extending and retracting the conveyor mechanism so as to keep pace with the actual coal removal at the face.

In a normal operation the floor conveyor in the mine sometimes must be "panned up" as much as four to eight times during a shift and, of course, during the panning up operation the conveyor mechanism must be shut down so that no coal can be transported out of the mine during that time.

A panning up operation may take as long as 15 to 20 minutes and normally entails the addition or removal of conveyor sections on the room or floor conveyor and the addition of an appropriate amount of chain scrapers or belt, as the case may be.

An object of the present invention is the provision of a novel conveyor structure which is operable to transport coal from a machine working at the mine face to the floor conveyor which permits the machine to operate at mine faces disposed within a greater area surrounding the floor conveyor so as to permit a more extended operation without the necessity of panning up the room or floor conveyor. The present invention is particularly suited to short wall mining procedures where the face at which the machine is operating has a limited width and the entire vein is mined in what might be regarded as a honeycomb fashion, leaving pillars of coal at spaced locations to aid in supporting the roof. In a normal short wall operation in driving entries and in room work the main portion of the coal is removed by advancing in the face in a direction longitudinally with respect to the floor conveyors. Any coal removal in the face in a direction laterally with respect to the conveyor is primarily for the purpose of breakthrough to insure a supply of air within the required limits to the face. The present process is based upon the concept of removing more of the coal in a direction transverse with respect to the axis of the floor conveyor so as to permit operation for a greater length of time with a given length of floor conveyor, so as to reduce the down time required to pan up the conveyor. As previously stated, reduction in down time results in an increase in production.

The present invention is also particularly adaptable to shortwall operations where the vein is relatively low. In such mines down time becomes a particularly critical consideration because there is not available a large quantity of coal in a given area and thus considerable more down time to pan up the conveyor is required. Indeed, it is in mines of this type where the straight longitudinal veins during one shift may require as much as two or three pan ups with the resulting loss in down time. By utilizing the present procedures, utilizing the same machine working at the face and the same room conveyors under the same mining conditions, down time resulting from the necessity to remove or add any pans to the floor conveyor can be reduced to less than one-third the time previously required. The conveyor structure of the present invention enables the machine working at the face to advance into face positions which are disposed laterally from the floor conveyor a considerably greater distance than the conveyor structures of the prior art. It is contemplated that in normal operation in mines, even as low as 28", the present conveyor structure would enable a crew to continuously operate throughout an entire shift without the necessity of panning up during the shift. Moreover, the arrangement is such that by panning up between shifts when required, actual down time during the shift can be reduced to an absolute minimum and in most cases, it will not be necessary at all.

Accordingly, it is an object of the present invention to provide a conveyor structure which is operable to obtain the above-mentioned results.

Another object of the present invention is the provision of a conveyor structure including two conveyor sections telescopically and horizontally swivelly interconnected so as to permit the machine working at the face which feeds coal thereto to be highly maneuverable, while at the same time providing a continuous transportation of the coal supplied from the machine to the floor conveyor.

Still another object of the present invention is the provision of a conveyor structure of the type described which is simple in construction, easy to operate and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 1 is a top plan view of a conveyor assembly embodying the principles of the present invention, the conveyor assembly being shown in cooperative relation with a continuous mining machine and a floor conveyor;

FIGURE 2 is a side elevational view of the structure shown in FIGURE 1;

FIGURES 4–11 are fragmentary top plan views illustrating the progressive development of the entry in the layout shown in FIGURE 3.

Figure 3:
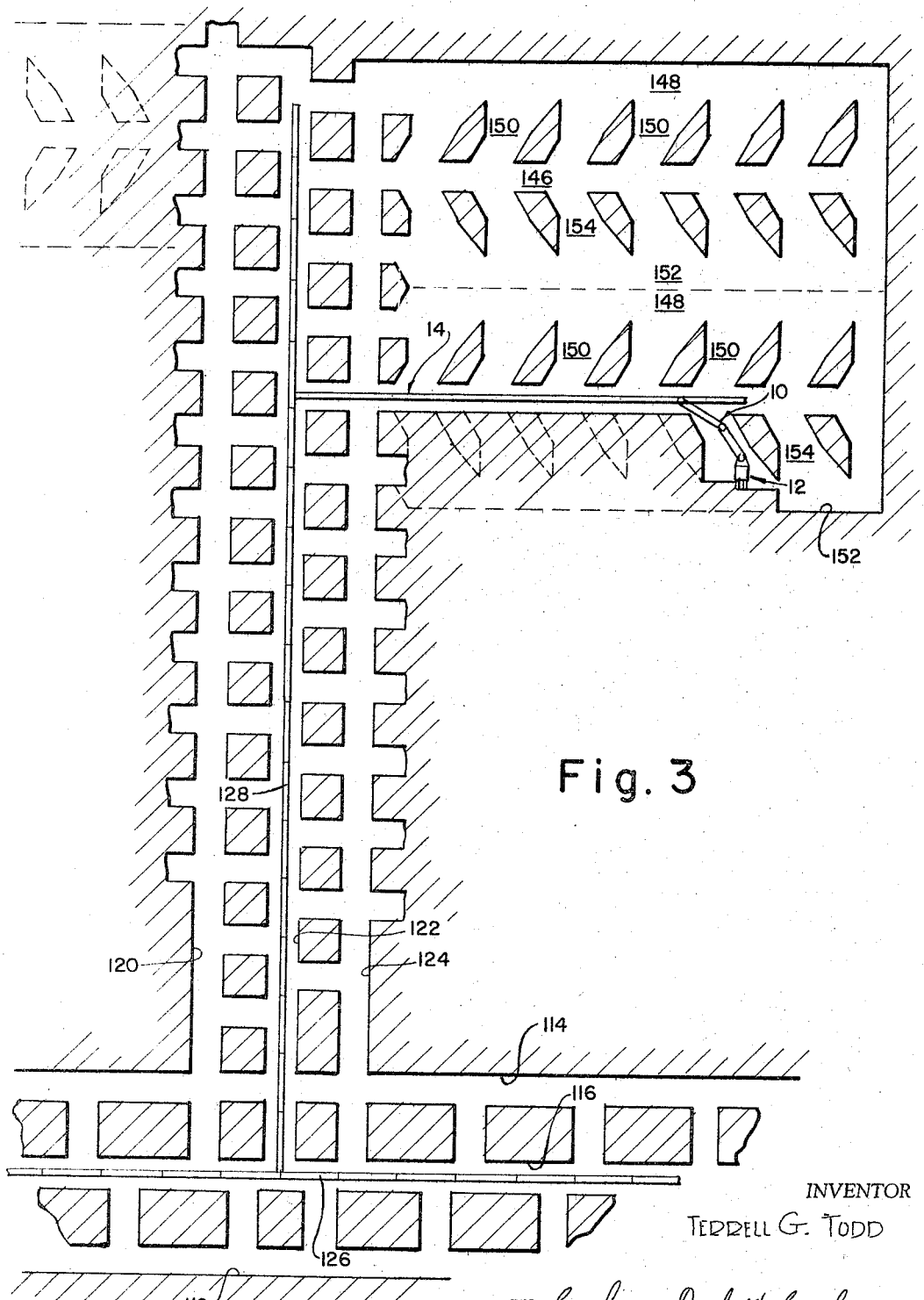
FIGURE 3 is a top plan view of a coal mine illustrating one embodiment of the manner in which the entry and room work can be developed utilizing the principles of the present method.

Referring now more particularly to the drawings, there is shown in FIGURES 1 and 2 a conveyor assembly, generally indicated at 10, embodying the principles of the present invention. The conveyor assembly 10 is shown connected between a continuous mining machine, generally indicated at 12, and a floor conveyor, generally indicated at 14.

While the conveyor assembly 10 of the present invention has generally utility with any type of machine capable of working at the mine face and delivering coal removed from the face to the floor conveyor, for purposes of illustration a dual auger type, low seam, short wall continuous mining machine 12 has been shown in conjunction therewith. Here again, the conveyor assembly 10 would have utility with other types of continuous mining machines but is particularly suited to the machine 12 illustrated, which constitutes the Wilcox Mark 20 Continuous Miner manufactured by the Wilcox Manufacturing Company of Raleigh, West Virginia. The machine 12 is constructed in accordance with the principles set forth in Wilcox Patent 2,967,701, the disclosure of which is hereby incorporated by reference into this application.

In brief, the machine 12 includes a main frame 16 which is supported for movement along the mine floor by thick metallic horizontal bottom plate 18. Disposed forwardly of the frame is a pair of auger cutters 20 and 22, each including a longitudinally extending shaft having a pair of helical blades mounted thereon, the blades being spaced longitudinally from each other approximately 180°. Formed on the forward end of each auger cutter is a cutting head having a plurality of cutting teeth mounted therein and each helical blade has a plurality of longitudinally spaced peripheral cutting teeth extending outwardly therefrom. As shown, the helical blades of the auger cutter 20 are oppositely pitched with respect to the helical blades of the auger cutter 22.

The rearward end of the shaft of each auger cutter is mounted in a vertically swingable arm assembly 24 which is capable of being pivoted about a longitudinally extending axis, by any suitable means, such as a hydraulic piston and cylinder unit 26. It will be understood that a suitable motor or the like (not shown) is mounted within the frame 16 and is connected to the auger cutters through the arm assemblies 24 so as to effect rotation of the auger cutters about their axes in opposite directions.

The frame 16 is moved longitudinally and transversely with respect to the mine face by means of a pair of drums 28 suitably connected with the motor within the frame 16 for selective operation in either direction. The drums 28 are arranged to receive cables 30 which may be seletcively trained about either an associated forward pulley 32 or an associated rearward pulley 34. It will be understood that by suitably anchoring the ends of the cables as by jacks (not shown) extending between the roof and the floor of the mine, and rotating the drums, the frame 16 may be advanced forwardly to sump in the auger cutters and then move them transversely across the face.

The coal removed from the face by the auger cutters 20 is conveyed laterally inwardly, as by forwardly monuted scrolls 36, into a central scraper conveyor assembly 38 having an operative upper flight extending upwardly and rearwardly from the forward end of the machine and then horizontally rearwardly beyond the rearward end thereof. Disposed in the forward portion of the frame adjacent each side thereof is a bottom plate 40 which is hinged adjacent the bottom of the frame for pivotal movement about a longitudinal axis and a suitable spring (not shown) is provided to resiliently urge each plate downwardly into engagement with the floor of the mine. Mounted just above each plate 40 is a clean-up scroll 42 which serves to convey the coal forwardly into the path of movement of the scrolls 36.

It will be understood that the continuous mining machine 12 may be operated in accordance with the method disclosed in the above-mentioned Wilcox patent.

The conveyor assembly 10 of the present invention includes a first conveyor section 44 having a coal receiving end 46 and a coal discharging end 48. It will be understood that the conveyor section 44 may be of any conventional conveyor structure either of the scraper type, as shown, or of the belt type. The conveyor section includes a frame made up of side rails 50 and a central plate 52 extending rigidly therebetween. Mounted on the frame is an endless scraper assembly which, as shown, includes an endless chain 54 having a series of longitudinally spaced flights 56 extending laterally outwardly therefrom. The chain 54 is trained about a sprocket wheel carried by a shaft 58 journaled on the forward end 46 of the conveyor section 44 and a sprocket wheel carried by a driven shaft 60, mounted on the rearward end 48 of the conveyor section, which shaft is driven by a suitable motor or the like, generally indicated by the numeral 61.

The forward end 46 of the conveyor section 44 extends downwardly and forwardly and has its forward extremity connected with the rearward portion of the conveyor assembly 38 extending from the machine 12 for limited tilting movement in a vertical plane and for swinging movement in a horizontal plane throughout a substantial arcuate distance. The connection may be of any suitable construction and as shown, includes a swivel ring 62 rotatably suspended from the conveyor assembly of the mining machine in a position rearward of and beneath the discharge end thereof so as to permit the coal to pass therethrough. The swivel ring is connected to the forward end of the section 44 so as to provide the above-mentioned limited tilting and substantial horizontal swinging movement by a pair of connecting links 64 pivoted to the ring 62 on opposed positions thereon and to the frame of the section 44.

The rearward end 48 of the conveyor section 44 is preferably connected with a second conveyor section 66 forming a part of the conveyor assembly 10. Again, the conveyor section 66 may either be of the scraper type, as shown, or of the belt type and includes a forward frame portion made up of rails 68 rigidly interconnected by a central horizontal plate 70 and a rearward frame portion made up of rails 72 rigidly interconnected as by a central horizontal plate 74. Preferably, the forward and rearward frame portions of the conveyor section 66 are pivotally interconnected, as indicated at 76, so as to provide for limited relative pivotal movement between the frame portions about a transverse horizontal axis. As before, an endless scraper assembly is carried by the forward and rearward frame portions which includes an endless chain 78 having a plurality of longitudinally spaced flights 80 extending laterally outwardly therefrom. The forward end of the chain is trained about a sprocket wheel carried by a shaft 81 suitably journaled on the forward end of the forward frame portion and the rearward end of the chain is trained about a rearward sprocket wheel carried by a shaft 82 suitably journaled in the rearward end of the rearward frame portion and driven by a motor, generally indicated at 83.

The forward frame portion of the conveyor section 66 extends horizontally from the forward extremity thereof and is arranged to be supported on the mine floor for movement therealong, as by a pair of horizontally extending longitudinally spaced skids 84. At a point adjacent the rearward extremity of the forward frame portion, the latter extends upwardly and rearwardly to a point of connection at the pivot 76 with the horizontally extending rails 72 of the rearward frame portion of the conveyor section 66.

The rearward end of the conveyor section 44 is mounted on the forward end of the conveyor section 66 for longitudinal movement with respect thereto for horizontal swinging movement with respect thereto and for limited tilting movement with respect thereto by any suitable means. As shown, a swivel ring 86, similar to the ring 62, previously described, is rotatably mounted on the frame of the section 44 in a position rearwardly of and beneath the discharge end of the conveyor thereof. Disposed below the swivel ring 86 is a wheeled skeletonized frame 88 having pairs of flanged wheels 90 journaled on the forward and rearward ends thereof for ridingly engaging the upper surface of the rails 68. The swivel ring is connected to the wheeled frame 88 as by a pair of depending rigid brackets, extending downwardly from the swivel ring at diametrically opposed positions thereon, pivoted, as at 92, to the wheeled frame.

The floor conveyor 14 is also of any conventional construction either of the scraper type, as shown, or the belt type, and includes a frame made up of a pair of rails 96 rigidly interconnected by a horizontal plate 98 and an endless scraper assembly including an endless chain 100 having a plurality of longitudinally extending flights 102 extending laterally outwardly therefrom.

The rearward end of the conveyor section 66 is mounted on the floor conveyor 14 for longitudinal movement with respect thereto, and for horizontal swinging movement with respect thereto and for limited tilting movement with respect thereto by any suitable means. Preferably, this connection is achieved by a structure similar to a structure previously described for connecting the rearward end of the conveyor section 44 to the forward end of the conveyor section 66. Thus, there is provided a swivel ring 104 rotatably mounted on the conveyor section 66 and pivotally connected, as at 106, to a wheeled frame 108 provided with forward and rearward pairs of flanged wheels 110 arranged to ride on the upper surface of the rails 96.

It can thus be seen that the conveyor assembly 10 provides a means for permitting the machine 12 to work and continuously convey coal from a face which is located within an area equal to the extent of the conveyor assembly 10 and the machine 12. Thus, the machine is not restricted to working a face which is disposed in generally longitudinal alignment with the floor conveyor 14, but may work at a face which is spaced laterally therefrom a considerable distance. In this way, a greater amount of coal may be worked and substantially continuously conveyed to the floor conveyor than was possible heretofore with conventional bridge conveyors utilized with machines working at the face.

To illustrate the greater production that can be achieved with a given machine working at the face by eliminating the down time of the machine necessitated by the extension or retraction of the floor conveyor to a point accessible to the machine, there is shown in FIGURE 3 a mine layout illustrating a method of mining in accordance with the principles of the present invention. The layout shown in FIGURE 3 includes three main entries, 114, 116 and 118 and three butt entries, 120, 122 and 124, communicating with the main entries. The layout also illustrates the manner in which the rooms are developed from the butt entries. In FIGURE 3 a central conveyor 126 is mounted within the central main entry 116, the conveyor 126 serving to convey the coal to a collection station (not shown) which is either out of the mine or disposed somewhere within the mine. Disposed in the central butt entry 122 is a floor conveyor 128 which serves to convey the coal from the room being developed to the conveyor 126. While the layout shown in FIGURE 3 illustrates a three-entry system, it will be understood that the present method is equally applicable to a two-entry system as well.

It will be understood that in any short wall mining operation safe mining practices require that air circulation be at all times within at least 100 feet of the working face. In the layout shown, the air circulation may be inwardly through one outer entry and outwardly through the other outer entry, the flow of air being controlled by blocking the breakthroughs between the entries in the conventional manner.

Figure 4:
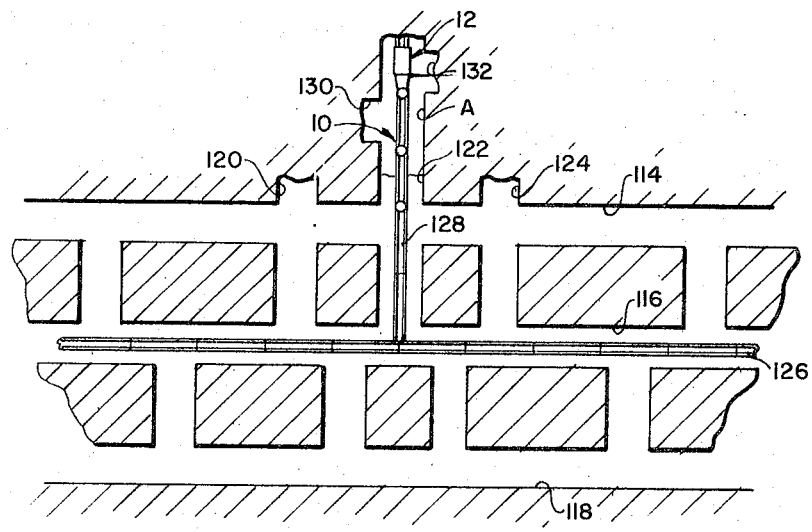

Referring now more particularly to FIGURES 5–11, the method of the present invention will now be described insofar as it relates to entry work. As shown in FIGURE 4, during the formation of the main entry 114, the butt entries 120, 122 and 124 are necked in. The entry work is commenced by setting up a section of the floor conveyor 128 in alignment with the central butt entry 122. The mining machine is advanced into the face provided by the previously necked in face of the central butt entry 122 inwardly thereof in a direction generally parallel with the floor conveyor section. As the machine progresses inwardly, the left-hand wall of the room section being formed is first necked in, as indicated at 130, and then the right-hand wall of the room section is necked in, as indicated at 132.

In accordance with conventional practice, the floor conveyor 128 is normally made up of six-foot sections and, the room work from the butt entries is on 50-foot centers, the lateral breakthroughs between the butt entries will likewise be on 50-foot centers, but staggered with respect to each other to provide maximum support. In one embodiment of the present invention, the machine 12 measures approximately 24 feet from the forward tip of the auger cutters, which are 4½ feet, to the axis of the connection with the conveyor section 44. The section 44 from its pivotal axis with the conveyor of the mining machine to its pivotal axis with the conveyor section 66 measures 32 feet. The second conveyor section 66 measures approximately 15 feet from its forward extremity to the pivot 76 and approximately 26½ feet from the pivot 76 to the pivotal axis provided by the track 108. With this arrangement there is approximately five feet of relative longitudinal movement within the limits provided between a conveyor section 44 and conveyor section 66. The entire conveyor assembly 10 and mining machine 12 provide a total reach of 94 feet. With this arrangement, it will be understood that the initial room section, indicated at A in FIGURE 4, may be advanced inwardly of the face beyond the previously necked in portion to a longitudinal extent of up to 89 feet. However, since the breakthroughs between entries are on 50-foot centers, the total advance can be between 49 and 63 feet, depending upon whether seven, eight or nine sections are to be added to the floor conveyor during each panning up operation. It will be understood that during the advance of the machine to form the entry or room section A, as shown in FIGURE 4, the skids 84 of the conveyor assembly 10 will be disposed laterally along one side of the floor conveyor, as indicated in FIGURE 1. Because of the relative horizontal swinging movement, as well as relative longitudinal movement, provided by the conveyor assembly 10, the skids can advance considerably beyond the extremity of the floor conveyor 128. After the room section A has been formed the floor conveyor 128 is then panned up in accordance with conventional practice with the skids 84 disposed on the left-hand side of the panned up conveyor.

Figure 5:
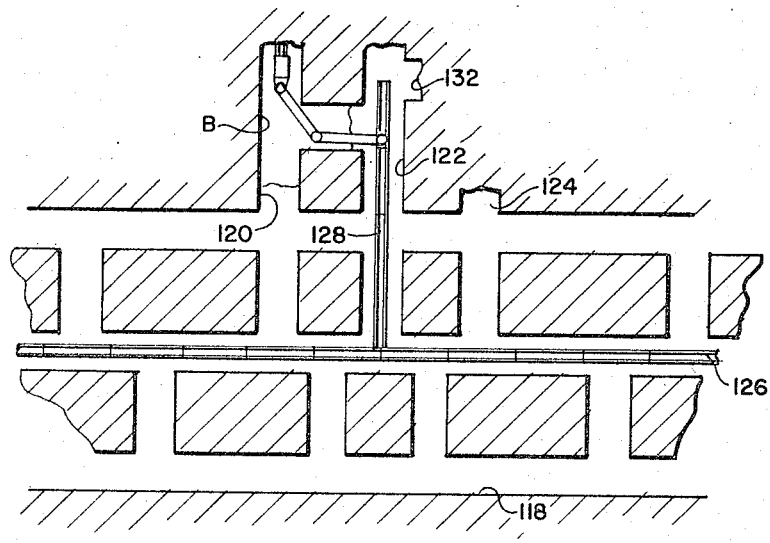
Figure 6:
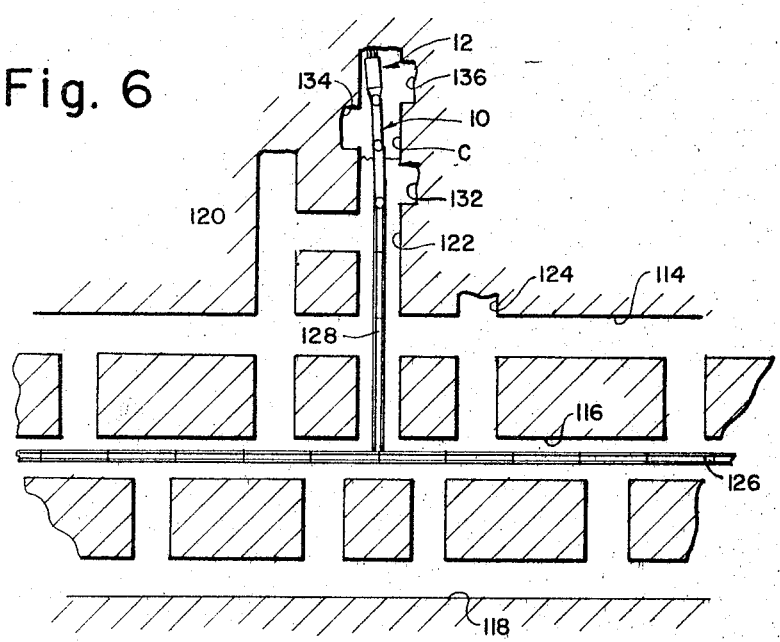

Next, an entry or room section B is formed as indicated in FIGURE 5 by advancing the machine into the face formed by the necked in portion 130, the room section B being formed by first advancing at right angles to the extent of the floor conveyor 128 and then turning at right angles to break through to the necked in portion of the entry 120 to establish flow of air. The machine is then backed out and advanced in the opposite direction to complete the room section B. Next, the entire assembly is moved out of the room section B back into the central butt entry 122 and then advanced forwardly in a direction forwardly and parallel to the floor conveyor 128 to form an entry or room section C as shown in FIGURE 6. Again, during the formation of the room section C, first the left-hand wall of the room section is necked in, as indicated at 134, and then the right-hand wall is necked in, as indicated at 136.

Figure 7:
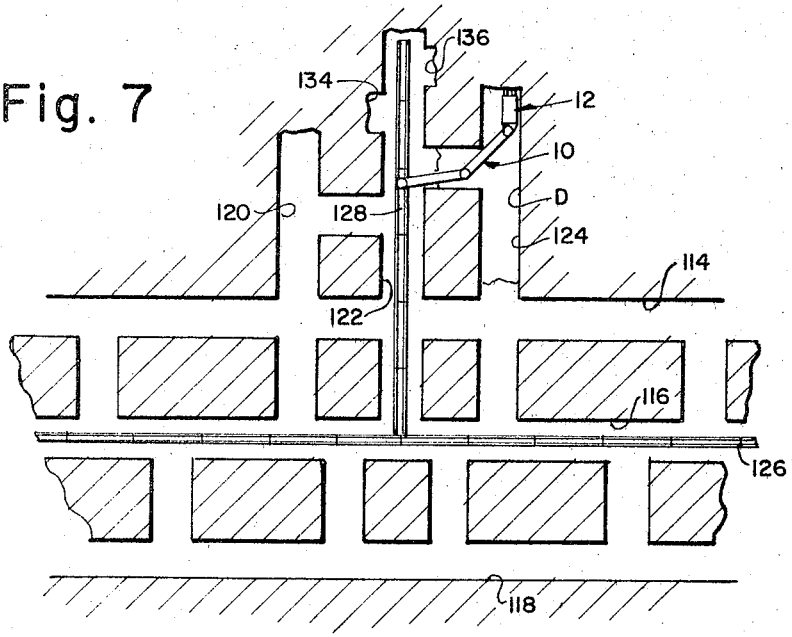

It will be noted that when the apparatus has moved into the position shown in FIGURE 6, the skids 84 will be disposed longitudinally forwardly of the end of the floor conveyor 128 and after the room section C has been completed, the apparatus is moved so that the skids will be disposed on the right-hand side of the conveyor. Next, the apparatus is backed down along the right-hand side of the conveyor and a room section D, as shown in FIGURE 7, is formed laterally inwardly from the face defined by the necked in portion 132. Here again, the room section D extends first in a direction perpendicular to the floor conveyor and then in a direction perpendicular to the first portion so as to break through to the necked in portion of the entry 124 and establish air flow. The section D is completed by advancing in a direction opposite from the direction of the breakthrough. It will be understood that the panning up operation into the section C formed as shown in FIGURE 6 may be accomplished prior to the formation of the section D or subsequent thereto, since, as shown in FIGURE 5, the end of the floor conveyor 128 extends sufficiently near the necked in portion 132 to permit the machine to form the room section D without the necessity of a panning operation.

Figure 8:
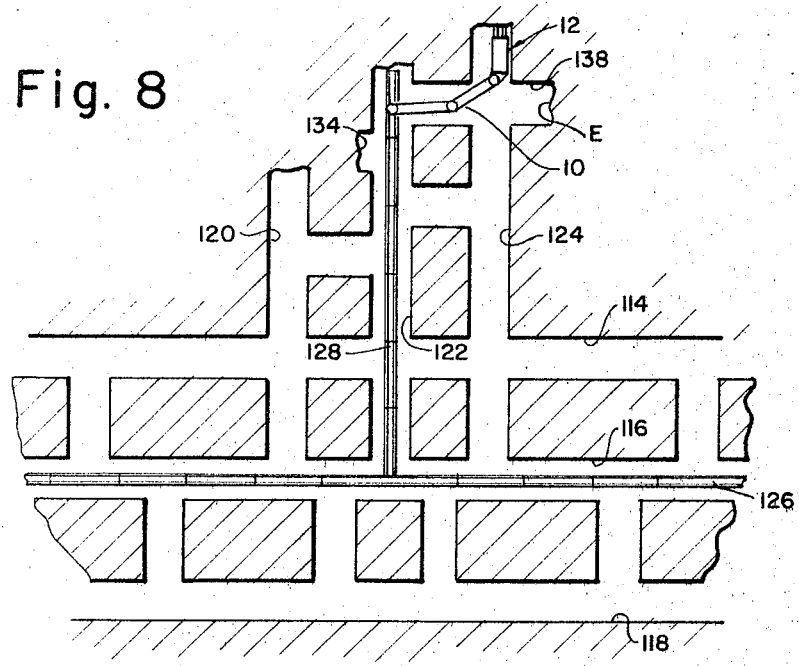

Assuming that the panning up operation has taken place it will be noted that the skids 84 are disposed on the right-hand side of the floor conveyor, as shown in FIGURE 7. Under these circumstances, it is advisable to form the next section as a section E such as shown in FIGURE 8. This section extends perpendicular to the floor conveyor from the face defined by the necked in portion 136 previously formed. It will be noted that the section E extends inwardly of the face and first provides a breakthrough with the previously formed face of the butt entry 124. The section E extends beyond the confines of the entry 124 so as to provide a necked in portion 138 to be utilized during the room work, as will hereinafter be more fully described. The section E is completed by advancing in the longitudinal direction of the entry 124.

Figure 9:
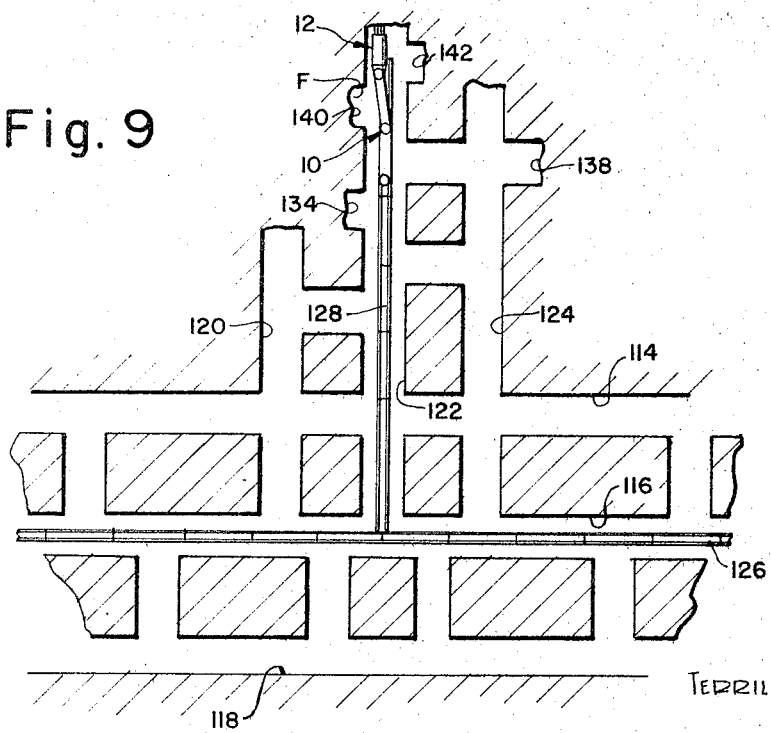

Next, the apparatus is backed out into the central butt entry 122 and is again advanced forwardly in a direction parallel to the floor conveyor 128 so as to form a room section F, shown in FIGURE 9. Again, the left-hand wall of the room section F is first necked in, as indicated at 140, and the right-hand wall of the room section is necked in, as indicated at 142. It will be noted that during the formation of the room section F the skids 84 of the conveyor assembly 10 will move from their initial position alongside the floor conveyor 128 adjacent the right side thereof to a position forwardly of the forward extent of the floor conveyor. When the room section F has been completed the apparatus is moved down alongside the left-hand side of the floor conveyor and a room section G is then formed as shown in FIGURE 10, by proceeding inwardly of the face defined by the necked in portion 134. Here again, as the coal is removed in a direction perpendicular to the longitudinal extent of the floor conveyor inwardly of the face, air will be established with the previous face formed in the entry 120 when the section B was formed as shown in FIGURE 5. The section G is completed by advancing in the direction of the entry 120 as shown in FIGURE 10. Again, the panning up of the floor conveyor may be accomplished either prior to the formation of the section G or subsequent thereto.

After the section G has been completed, the apparatus is backed out into the central entry with the skids alongside the left-hand side of the conveyor. Next a section H is formed, as shown in FIGURE 11, proceeding inwardly of the face defined by the necked in portion 140. Again, the removal of the coal proceeds in a direction perpendicular to the longitudinal extent of the floor conveyor, first to establish air circulation with the entry 120 along the face previously formed therein during the formation of the section G, as shown in FIGURE 10, and then straight inwardly beyond the wall of the entry 120 to provide a necked in portion 144 similar to the necked in portion 138 previously described which is utilized in the room work.

It will be understood that the formation of the butt entries may be completed by repeating the procedures described above. It has been found under normal conditions in actual operation that even when working in relatively low coal where there must be a relatively great amount of advance in order to obtain high production, the conveyor assembly 10 enables the crew to maintain the mining machine at a working face for a period at least equal to one shift without the necessity of panning up. This makes it possible for the panning up operations to take place between shifts, thus further reducing the down time previously required because of the necessity of panning up floor conveyors.

Referring now more particularly to FIGURE 3, in normal room work the apparatus will first be advanced longitudinally into the necked in portion previously provided in the formation of the entry in a direction perpendicular to the main conveyor 128 in the central butt entry. After the first advancement a floor conveyor, such as the conveyor 14, is panned up into the room section first formed and the apparatus is backed down with the skids disposed on the left-hand side of the conveyor.

Next, the machine is advanced into the left-hand side wall of the first room section formed so as to form a second room section which extends laterally at an angle of approximately 60° for a first portion having a substantially uniform width, then extends laterally for a second portion which increases in width and finally terminates with a portion of uniform width having a width substantially greater than the width of the first mentioned portion.

The room development proceeds in the fashion indicated above with the terminal portion of each lateral room section communicating with the terminal portion of the lateral section presiously formed. In this way, adequate circulation is maintained to the working face. During the development in the direction away from the floor conveyor 128, two elongated rooms 146 and 148 are formed which are interconnected by a plurality of breakthroughs 150 extending therebetween, the breakthroughs being relatively closely spaced.

Again, it will be noted that sufficient coal can be removed during the formation of a section of the room 146, the related breakthroughs 150 and sections of the room 148 to provide continuous operation for one crew during one shift. The panning up operations are preferably carried out between shifts, and of course, the panning up operation must keep pace with the progress of the development of the sections of the room 146 in a direction away from the main conveyor 128.

When the end of the room development is reached, the machine is advanced into the end of the right hand side wall of the conveyor room 146 and by moving the machine back down the conveyor 14 with the skids disposed on the right hand side thereof a plurality of lateral room sections of a shape similar to the shape of the left hand lateral room sections previously described are formed proceeding in a direction toward the main conveyor 128. Thus, in this operation there is formed a third room 152 which is parallel to the conveyor room 146 and interconnected therewith by a plurality of relatively closely spaced breakthroughs 154 which provide for adequate air circulation. Again, it will be noted that the formation of the breakthroughs 154 and separate sections of the room 152 afford the crew sufficient coal to operate throughout one shift without the necessity of reducing the length of the conveyor 14. As before, the conveyor 14 is reduced in length preferably in between shifts, and it will be noted that two or more of the breakthroughs and related sections of the room 152 can be formed before it is necessary to reduce the length of the conveyor 14.

It should be noted that the manner in which the sections of the conveyor assembly 10 are interconnected enables the operator to maneuver the machine 12 not only in a direction extending generally longitudinally with respect to the conveyor, but in a direction perpendicular thereto, so that operations as exemplified above can be carried out with the attendant savings in down time. This lateral movement is achieved by the horizontal swinging connections of the sections of the conveyor assembly 10. The relative titling movement provided enables the conveyor assembly 10 to follow undulations in the mine bottom. It will be noted that the forward portion of the section 66 will be maintained in contact with the bottom through the support of the skids 84 by virtue of the weight of the discharge end 48 of the conveyor section 44. Thus, the pivot point 76 will be maintained in proper position so that the rear portion of the section 66 is supported between the pivot points 76 and 106.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. Apparatus for use in conveying coal from the conveyor of a machine working at a mine face to a spaced floor conveyor arranged to convey the coal away from the face comprising first and second cooperating elongated conveying means each having a coal receiving end and a coal discharging end, means for connecting the receiving end of said first conveying means with the machine for limited tilting movement and for generally horizontal swinging movement with respect thereto in a position to receive the coal discharging from the conveyor of the machine, means supporting the receiving end of said second conveying means for longitudinal and transverse movement along the mine floor, means mounting the discharge end of said first conveying means on the receiving end of said second conveying means for longitudinal movement thereabove for limited tilting movement with respect thereto and for generally horizontal swinging movement with respect thereto so as to discharge the coal from the discharge end of said first conveying means onto the second conveying means in any position of movement with respect thereto, and means for mounting the discharge end of said second conveying means on the floor conveyor for longitudinal movement thereabove, for limited tilting movement with respect thereto and for generally horizontal swinging movement with respect thereto so as to discharge the coal from the discharge end of said second conveying means onto the floor conveyor in any position of movement with respect thereto.

2. Apparatus as defined in claim 1 wherein said first and second conveying means comprise first and second scraper conveyor assemblies, said second scraper conveyor assembly including forward and rearward conveyor portions mounted in longitudinal alignment for limited pivotal movement about a transverse horizontal axis.

3. Coal mining apparatus comprising a continuous mining machine including a frame power operated digging means at the forward portion of the machine for removing coal engaged thereby from a mine vein and conveyor means having a forward end disposed in a position to receive the coal removed by said digging means and a discharge end extending rearwardly of said frame, first elongated conveying means having a coal receiving end connected with the discharge end of said conveyor means for generally horizontal swinging movement with respect thereto in a position to receive the coal discharging from the discharge end of said conveyor means, a second elongated conveying means having a coal receiving end, said first conveying means having a discharge end connected with the coal receiving end of said second conveying means for horizontal swinging movement with respect thereto so as to discharge the coal from the discharge end of said first conveying means onto the second conveying means in any position of movement with respect thereto, an elongated floor conveyor, said second conveying means having a discharge end, and means for mounting the discharge end of said second conveying means for longitudinal movement above said floor conveyor in the mine and for generally horizontal swinging movement with respect thereto so as to discharge the coal from the discharge end of said second conveying means onto said floor conveyor in any position of movement with respect thereto.

4. Apparatus as defined in claim 3 including means for supporting the coal receiving end of said second elongated conveying means for longitudinal and transverse movement along the mine floor.

5. Apparatus as defined in claim 4 including means mounting the discharge end of said first elongated conveying means on the receiving end of said second elongated conveying means for longitudinal movement with respect thereto.

6. Coal mining apparatus comprising a frame supported for movement along a mine floor, a pair of oppositely pitched rotary auger cutters mounted on the forward end of said frame in horizontally spaced relation for independent vertical movement, means carried by said frame for rotating said auger cutters in opposite directions, means for effecting vertical movement of each of said auger cutters, means on said frame for advancing said auger cutters into a mine face and across the same, a conveyor assembly carried by said frame having a receiving end disposed in a position to convey the coal removed from the mine vein by said auger cutters rearwardly and a discharge end extending rearwardly of said frame, a first elongated conveyor section having a coal receiving end connected with the discharge end of said conveyor assembly for limited tilting movement and for generally horizontal swinging movement with respect thereto in a position to receive the coal discharging from the conveyor assembly, a second elongated conveyor section having a coal receiving end, means supporting the coal receiving end of said second conveyor section for longitudinal and transverse movement along the mine floor, said first conveyor section having a discharge end connected above the coal receiving end of said second conveyor section for longitudinal movement with respect thereto, for limited tilting movement with respect thereto and for generally horizontal swinging movement with respect thereto so as to discharge the coal from the first conveyor section onto the first conveyor section in any position of movement relative thereto, an elongated floor conveyor, said second conveyor section having a discharge end, and means for mounting the discharge end of said second conveyor section above said floor conveyor for longitudinal movement with respect thereto, for limited pivotal movement with respect thereto and for generally horizontal swinging movement with respect thereto so as to discharge the coal from the second conveyor section onto said floor conveyor in any position movement relative thereto.

7. Apparatus as defined in claim 6 wherein said second conveyor section includes forward and rearward portions mounted in longitudinal alignment for limited pivotal movement with respect to each other about a transverse horizontal axis.

References Cited by the Examiner

UNITED STATES PATENTS

| 2,604,201 | 7/1952 | Gleeson | 198—89 X |
| 2,967,701 | 1/1961 | Wilcox | 299—18 |
| 2,992,722 | 7/1961 | Moon | 198—89 X |
| 3,107,776 | 10/1963 | Long | 198—92 X |

ERNEST R. PURSER, *Primary Examiner.*